(12) United States Patent
Ishida

(10) Patent No.: US 7,098,985 B2
(45) Date of Patent: Aug. 29, 2006

(54) MULTILAYER EXTERNAL CONNECTION STRUCTURE HAVING THIRD LAYER COVERING SIDEWALLS OF THE FIRST AND SECOND, MADE OF REFLECTIVE CONDUCTIVE MATERIAL

(75) Inventor: Yukimasa Ishida, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 70 days.

(21) Appl. No.: 10/652,511

(22) Filed: Sep. 2, 2003

(65) Prior Publication Data

US 2004/0080688 A1 Apr. 29, 2004

(30) Foreign Application Priority Data

Sep. 12, 2002 (JP) ............................. 2002-266973
Jul. 23, 2003 (JP) ............................. 2003-200471

(51) Int. Cl.
*G02F 1/1345* (2006.01)
(52) U.S. Cl. .................. 349/152; 349/147; 349/148; 349/149; 349/113; 349/114
(58) Field of Classification Search ........ 349/147–154, 349/113–114
See application file for complete search history.

(56) References Cited

U.S. PATENT DOCUMENTS

| | | | |
|---|---|---|---|
| 6,444,484 B1 * | 9/2002 | Ahn | .............................. 438/30 |
| 6,466,280 B1 * | 10/2002 | Park et al. | ..................... 349/43 |
| 6,529,251 B1 | 3/2003 | Hibino et al. | |
| 6,809,785 B1 * | 10/2004 | Fujino | ......................... 349/114 |
| 2001/0009222 A1 * | 7/2001 | Mizouchi et al. | ...... 204/192.17 |
| 2002/0045351 A1 * | 4/2002 | Jo | .............................. 438/694 |
| 2004/0080688 A1 * | 4/2004 | Ishida | ......................... 349/113 |

FOREIGN PATENT DOCUMENTS

| | | |
|---|---|---|
| JP | A-6-289414 | 10/1994 |
| JP | A-10-268345 | 10/1998 |
| JP | A-10-335303 | 12/1998 |
| JP | A 2000-241832 | 9/2000 |
| JP | A-2000-243834 | 9/2000 |
| JP | A 2001-188240 | 7/2001 |
| KR | A 2000-0062586 | 10/2000 |

* cited by examiner

*Primary Examiner*—Andrew Schechter
*Assistant Examiner*—Phu Vu
(74) *Attorney, Agent, or Firm*—Oliff & Berridge, PLC

(57) ABSTRACT

The invention provides highly reliable wiring and connection terminals of an electro-optic device used as a transflective liquid crystal device or the like. Since sidewalls and a part of an upper surface of a data line are covered with a reflection film, a central layer is not etched by an etchant when the reflection film is formed by patterning. In addition, since a transparent conductive film is connected to an upper layer of the data line via a contact hole, the resistance of a connection terminal can be decreased, and superior conduction can be obtained.

13 Claims, 12 Drawing Sheets

Sa1: FIRST STEP

Sa2: SECOND STEP

Sa3: THIRD STEP

Sa4: FOURTH STEP

Sa5: FIFTH STEP

Sa6: SIXTH STEP

Sa7: SEVENTH STEP

MULTILAYER EXTERNAL CONNECTION STRUCTURE HAVING THIRD LAYER COVERING SIDEWALLS OF THE FIRST AND SECOND, MADE OF REFLECTIVE CONDUCTIVE MATERIAL

BACKGROUND OF THE INVENTION

1. Field of Invention

The present invention relates to manufacturing methods of wiring structures and electro-optic panels. The invention also relates to electro-optic panels, wiring structures thereof, and electronic devices.

2. Description of Related Art

Electro-optic devices, such as a liquid crystal device, are each formed of two substrates bonded to each other with a predetermined gap between. The distance between the substrates is defined by an external frame, which is referred to as a seal portion and has an approximately square shape, and an electro-optic material, such as liquid crystal, is to be filled inside the seal portion.

The electro-optic devices described above include: a transmissive type device in which display is performed using light emitted from a backlight; a reflective type device in which display is performed using external light reflected from the inside of the device; and a transflective type device in which display is performed using external light in a bright place and using light emitted from an embedded backlight in a dark place.

As the transflective type electro-optic device, a related art internal reflection type device can be used that has a transflective electrode provided in each of pixels arranged in a matrix. In this device, the transflective electrode is formed by providing a transparent electrode made of an ITO (indium tin oxide) film or the like on a reflection electrode or a reflection film, which is made of an Al (aluminum) film or the like.

In addition, a thin film transistor (hereinafter "TFT") is provided in each pixel. A source of the TFT is connected to a corresponding data line, a drain of the TFT is connected to a corresponding transparent electrode, and a gate of the TFT is connected to a corresponding scanning line. The data lines and the scanning lines extend from the inside to the outside of the seal portion, and at the ends of the lines, connection terminals are formed. The structure described above is disclosed, for example, in Japanese Unexamined Patent Application Publication No. 06-289414 (p. 2, FIG. 2). In addition, as disclosed in Japanese Unexamined Patent Application Publication No. 2000-243834 (p. 7), as a wiring structure of the data line, a three-layered structure formed of titanium, aluminum, and titanium nitride in that order may be used in some cases.

Next, a substrate having TFTs is manufactured by a process which basically includes: first forming TFTs on a board made of glass or the like; second forming a wiring structure of data lines and the like; third sequentially forming a protection film and an acrylic layer on the wiring structure; fourth forming reflection electrodes; and fifth forming transparent electrodes.

SUMMARY OF THE INVENTION

In the structure described above, the wires, such as the data lines, extend outside the seal portion so as to receive signals supplied from the outside, and hence connection terminals must be formed at the ends of the wires in order to ensure good electrical connection. In addition, the connection terminals must be formed in the manufacturing process described above.

A cross-sectional view of a connection terminal portion is shown in FIG. 16. In this example, the protection film and the acrylic layer are provided on the wiring in that order even outside the seal portion, and in the fifth step described above in which the transparent electrodes are formed, the connection terminal is formed through a contact hole using the same material as that for the transparent electrode. In this example, by using the acrylic layer patterning mask, the protection film can be patterned.

However, since the acrylic layer has a tendency to swell with environmental moisture, it may cause peeling of the connection terminal in some cases, and as a result, the reliability of this process has been very disadvantageously decreased.

Accordingly, as shown in FIG. 17, the structure may also be designed in which the connection terminal portion outside the seal portion is formed without using the acrylic layer. In this case, although the reliability of the connection terminal is enhanced, the protection film must be formed by patterning using a mask different from the acrylic layer. Hence, a problem may arise in that the manufacturing cost is increased.

Furthermore, as shown in FIG. 18, the structure may also be designed in which the connection terminal portion outside the seal portion is formed without using the protection film and the acrylic layer. In this case, when the reflection electrode is patterned, the central layer (aluminum layer) of the three-layered structure is etched by an etchant, and as a result, a problem occurs in that side-cut is formed in the central layer. When the transparent conductive film is formed on the wiring, the edge portions thereof cannot be well covered, the transparent conductive film is peeled, and the peeled fragments thereof will adhere between pixel electrodes, resulting in a problem of connection failure.

The present invention addresses the above and/or other problems, and provides manufacturing methods of a wiring structure and an electro-optic panel, an electro-optic panel, a wiring structure thereof, and an electronic apparatus.

To this end, in accordance with one aspect of the present invention, a method for manufacturing a wiring structure, includes: forming wiring having a first layer and a second layer provided thereon; patterning a third layer by etching so that the third layer covers at least the sidewalls of the wiring and exposes a part of the upper surface of the second layer; and forming a fourth layer at least on the exposed portion of the second layer of the wiring. In the method described above, the second layer has resistance against an etchant used to etch the third layer, and on the other hand, the first layer is etched by the etchant.

According to the present invention, since the side walls of the wiring are covered with the third layer, in the patterning of the third layer by etching, the etchant will not etch the first layer. Accordingly, a highly reliable wiring structure can be manufactured.

According to the method described above, the first layer and the third layer may be formed of the same material. In addition, the forming of the fourth layer preferably includes a substep which is performed in an atmosphere containing oxygen so that an oxide layer having a relatively high resistance per unit area as compared to that of the second layer is formed at the interface between the third layer and the fourth layer, and the second layer is preferably formed of a conductive material which is less readily oxidized as compared to that for the third layer. According to the present invention, even when an oxide film is formed at the interface between the third layer and the fourth layer, since the material for the second layer is less readily oxidized as compared to that for the third layer, the conductivity between the second layer and the fourth layer is superior. As a result, when the fourth layer is used as a surface of the connection terminal, a connection terminal having a low resistance can be formed.

In addition, the wiring described above has a three-layered structure including a lower layer under the first layer, and the step of forming the wiring, described above, preferably includes forming the lower layer, the first layer, and the second layer in that order by patterning. In this case, the same mask may be used for the patterning as described above.

Furthermore, it is preferable that the first layer contain aluminum, the second layer contain titanium nitride, and the fourth layer contain indium titanium oxide.

Next, a method for manufacturing an electro-optic device in accordance with another aspect of the present invention is a method for manufacturing an electro-optic device having a structure in which an electro-optic material is enclosed inside a seal portion. The method described above includes: forming a plurality of semiconductor elements with electrodes, arranged in a matrix on a substrate; forming wiring which are composed of a first layer and a second layer provided thereon and which are connected to connection terminals to be formed outside the seal portion; forming an insulating layer on the semiconductor elements inside the seal portion; forming a plurality of reflection electrodes on the insulating layer using a first material so as to correspond to the semiconductor elements and of forming a third layer for the wiring so as to cover at least the sidewalls thereof and to expose a part of the second layer at each of the connection terminals; and forming transparent electrodes using a second material so as to cover the reflection electrodes and of forming a fourth layer at least on the exposed portion of the second layer of the wiring located outside the seal portion.

According to the present invention, since the reflection electrode and the third layer can be simultaneously formed, and the transparent electrode and the fourth layer can also be simultaneously formed, the number of the manufacturing steps can be reduced. In the present invention, as the semiconductor element, for example, a TFT or a thin-film diode (TFD) may be used.

In addition, in the method of manufacturing an electro-optic device, described above, the first layer is preferably formed of the first material. In this case, the first layer is etched by an etchant used for forming the reflection electrode and the third layer by patterning. However, since the sidewalls of the wiring are covered with the first material to form the third layer, the first layer can be prevented from being etched.

In the method of manufacturing an electro-optic device, described above, the forming of the transparent electrodes and the fourth layer preferably includes a substep which is performed in an atmosphere containing oxygen so that an oxide layer having a relatively high resistance per unit area as compared to that of the second layer is formed at the interface between the third layer and the fourth layer, and the second layer is preferably formed of a material which is less readily oxidized as compared to that for the third layer. According to the present invention, even when an oxide film is formed at the interface between the third layer and the fourth layer, since the material for the second layer is less readily oxidized than the third layer, the conductivity between the second layer and the fourth layer is superior. As a result, a connection terminal having a low resistance can be formed.

In addition, in the method of manufacturing an electro-optic device, described above, the wiring described above has a three-layered structure including a lower layer under the first layer, and the forming of wiring, described above, preferably includes forming the lower layer, the first layer, and the second layer in that order by patterning. In addition, it is preferable that the first layer contain aluminum, the second layer contain titanium nitride, the first material contain aluminum, and the second material contain indium titanium oxide.

An electro-optic device in accordance with another aspect of the present invention is an electro-optic device which includes an electro-optic material enclosed inside a seal portion and connection terminals disposed outside the seal portion. In the electro-optic device described above, the connection terminals each include: a first layer; a second layer provided on the first layer; a third layer which is formed so as to cover at least the sidewalls of the first layer and the second layer and so as to expose a part of the second layer; and a fourth layer formed on the exposed portion of the second layer. In addition, the electro-optic device described above may further include pixels each formed of a reflection electrode composed of a reflective conductive material and a transparent electrode composed of a transparent conductive material. Furthermore, the reflection electrode and the third layer may be formed of the same reflective conductive material, and the transparent electrode and the fourth layer may be formed of the same transparent conductive material.

In addition, an electro-optic device in accordance with another aspect of the present invention includes: an electro-optic material enclosed inside a seal; and connection terminals disposed outside the seal portion. In the electro-optic device described above, the connection terminals and the wiring include a first layer, a second layer provided on the first layer, and a third layer which is formed so as to cover at least the sidewalls of the first layer. In addition, the third layer of each of the connection terminals is formed so as to expose a part of the second layer, and the connection terminals each further comprise a fourth layer formed on the exposed portion of the second layer.

According to the present invention described above, since the sidewalls of the wiring are covered with a third layer t, in the forming of the third layer by patterning using an etching technique, the etchant used therefor will not etch the first layer. Hence, a highly reliable wiring structure can be formed.

In the electro-optic device described above, the reflection electrode and the third layer are preferably formed of the same material, and the transparent electrode and the fourth layer are preferably formed of the same material. In the case described above, the manufacturing process can be simplified.

Next, an electro-optic device in accordance with another aspect of the present invention is an electro-optic device which includes: an electro-optic material enclosed inside a seal portion; a plurality of semiconductor elements arranged in a matrix inside the seal portion; pixels each formed of a reflection electrode composed of a reflective conductive material and a transparent electrode composed of a transparent conductive material so as to correspond to the semiconductor elements; connection terminals formed outside the seal portion; and wiring having a first layer and a second layer provided thereon and connected to the connection terminals. In the electro-optic device described above, the connection terminals each include: a third layer formed so as to cover at least the sidewalls of the first layer and the second layer and to expose at least a part of the second layer; and a fourth layer formed on the exposed portion of the second layer. According to the present invention, since the sidewalls of the wiring are covered with a third layer, when the third layer is formed by patterning using an etching technique, the first layer will not be etched by the etchant used therefor. Accordingly, a highly reliable electro-optic device can be provided.

The electro-optic device described above may further include at least one organic insulating film having protrusions and depressions, which is formed inside the seal portion and on the semiconductor elements. In the above electro-optic device, the reflection electrode has protrusions and depressions because it is formed on the organic insulating film, the transparent electrode is formed so as to cover the reflection electrode, the reflection electrode and the third layer are preferably formed of the same reflective conductive material, and the transparent electrode and the fourth layer are preferably formed of the same transparent conductive material. In the case described above, the manufacturing process can be simplified.

In addition, it is preferable that the wiring has a three-layered structure having a lower layer under the first layer, the lower layer contain titanium, the first layer contain aluminum, the second layer contain titanium nitride, the reflection electrode and the third layer contain aluminum, and the transparent electrode and the fourth layer contain indium tin oxide.

Next, an electronic apparatus of the present invention includes the electro-optic device described above, and as display units of electronic apparatuses using a transflective electro-optic device, for example, the following may be used: display units of a mobile phone and a pager; monitor units of a liquid crystal television, a personal computer, and a mobile terminal; and a viewfinder unit of a camera; for example.

The above and other features and advantages of the present invention will become apparent from the following description with reference to the attached drawings.

BRIEF DESCRIPTION OF THE DRAWINGS

FIG. 5 is a cross-sectional view of a data line 6a;

FIG. 6 is a cross-sectional view showing another structural example of the data line 6a;

DETAILED DESCRIPTION OF PREFERRED EMBODIMENTS

Exemplary embodiments of the present invention are described with reference to drawings. In the exemplary embodiments described below, the electro-optic device of the present invention is applied to a transflective type liquid crystal device. In the exemplary embodiment, as an example of the electro-optic device, a transflective type liquid crystal device provided with a backlight which has a TFT active matrix drive system in the drive circuit is described.

<1. Entire Structure of Liquid Crystal Device>

Figure 1:
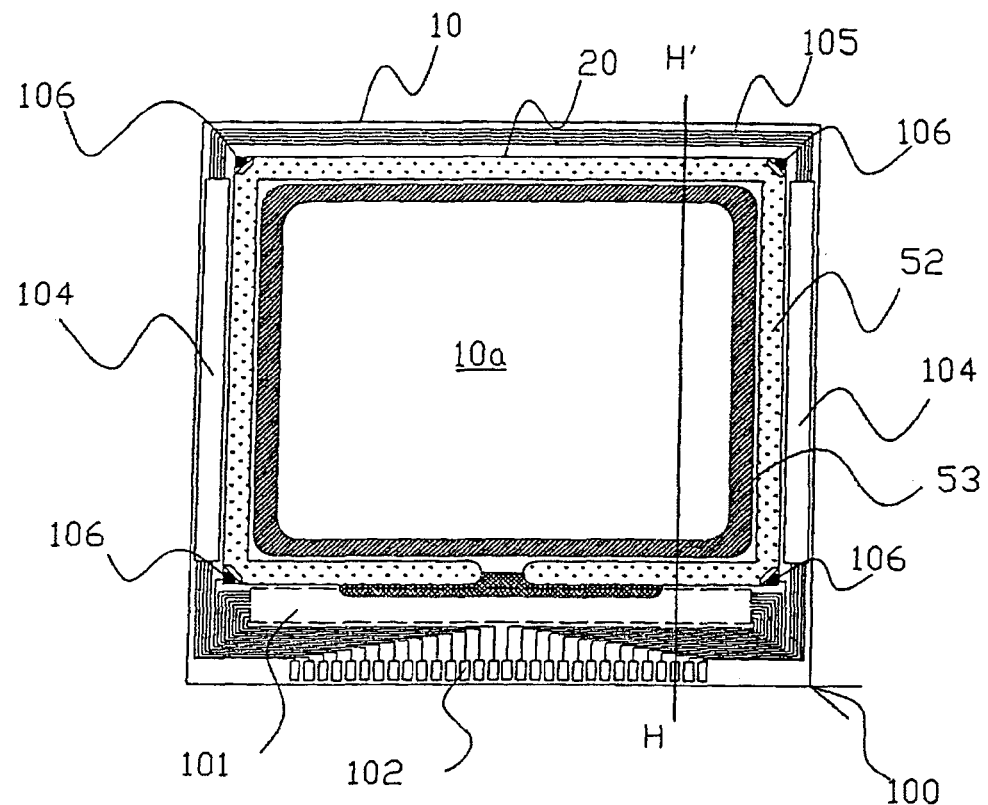
FIG. 1 is a plan view of an electro-optic device of an embodiment according to the present invention.

First, the entire structure of the electro-optic device is described with reference to FIGS. 1 and 2. FIG. 1 is a plan view of a TFT array substrate together with various constituent elements formed thereon, the substrate being viewed from the side of the facing substrate, and FIG. 2 is a cross-sectional view taken along plane H–H' shown in FIG. 1.

Figure 2:
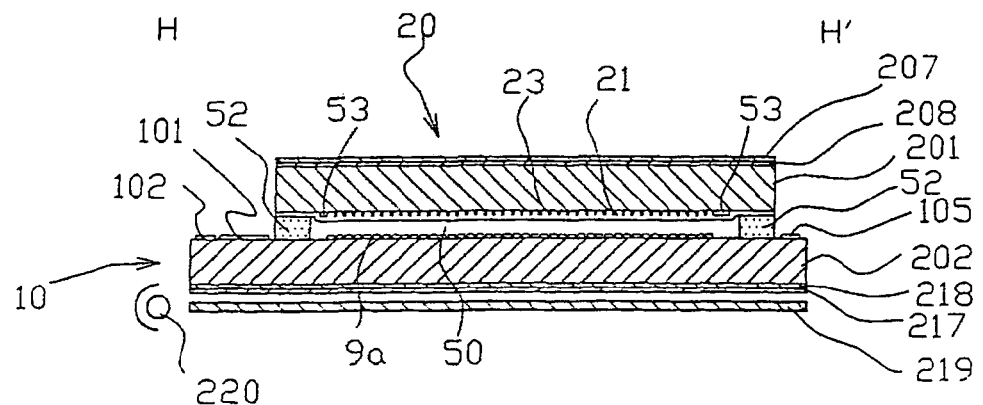
FIG. 2 is a cross-sectional view of the electro-optic device taken along plane H–H' shown in FIG. 1.

In FIGS. 1 and 2, in the electro-optic device of this exemplary embodiment, a TFT array substrate 10 and a substrate facing the TFT array 20 are placed so as to face each other. Between the TFT array substrate 10 and the substrate facing the TFT array 20, a liquid crystal layer 50 is provided, and the TFT array substrate 10 and the substrate facing the TFT array 20 are bonded to each other with a seal portion 52 placed around the periphery of an image display region 10a.

A material for the seal portion 52 used to bond the two substrates to each other is composed, for example, of a ultraviolet curable resin or a thermosetting resin and is applied onto the TFT array substrate 10 in the manufacturing process, followed by irradiation with ultraviolet rays or heating for curing.

In the seal portion 52, in order to define the gap between the substrates, a gap material, such as glass fibers or glass beads, is dispersed. Alternatively, in the case of a relatively large liquid crystal device, in addition to or instead of the material described above, glass fibers, glass beads, or the like may be dispersed in the liquid crystal layer 50. In addition, a great number of parts in the form of ligament of scallop may be provided between the pixels over the entire image display region 10a.

Along the inside of a seal region defined by the seal portion 52, a picture-frame light shielding film 53 having shading properties, which defines a picture frame region of the image display region 10a, is proved at the side substrate facing the TFT array 20. However, a part or the entirety of the picture-frame light shielding film as described above may be formed at the side facing TFT array substrate 10 as an embedded light shielding film.

Of regions extending along the periphery of the image display region, along one side of the peripheral region located outside the seal portion 52, a data line drive circuit 101 and external circuit connection terminals 102 are provided, and scanning line drive circuits 104 are provided along the two sides adjacent to said one side. Furthermore, a plurality of wires 105 is provided along the remaining side of the TFT array substrate 10 to connect the scanning line drive circuits 104 provided on the two sides of the image display region 10*a* to each other. In addition, as shown in FIG. 1, at the four corner portions of the substrate facing the TFT array 20, vertical conduction members 106 are provided, each functioning as a vertical connection terminal to electrically connect the substrates to each other. In addition, in the TFT array substrate 10, vertical connection terminals are provided in areas corresponding to the corners described above. Accordingly, the electrical connection between the TFT array substrate 10 and the substrate facing the TFT array 20 can be obtained.

In FIG. 2, the TFT array substrate 10 includes a second transparent board 202 made of a quartz plate, a glass plate, or the like as the substrate main body. On the second transparent board 202, TFTs to provide pixel switching, wires such as scanning lines and data lines, and pixel electrodes 9*a* are formed, and on the topmost position, an alignment film is further formed. In addition, the substrate facing the TFT array 20 includes a first transparent board 201 made of a quartz plate, a glass plate, or the like as a substrate body. On the first transparent board 201, a electrode 22 facing the TFT array substrate 10 and a light shielding film 23 in the form of grating are formed, and over these, an alignment film is further formed. In addition, the liquid crystal layer 50 is composed, for example, of at least one type of nematic liquid crystal, and the liquid crystal is put in a predetermined alignment state between the pair of the alignment films described above.

The substrate facing the TFT array 20 further includes a polarizer 207 and a retardation film 208 at the side of the first transparent board 201 opposite from the liquid crystal layer 50.

The TFT array substrate 10 further includes a polarizer 217 and a retardation film 218 at the side of the second transparent board 202 opposite from the liquid crystal layer 50. In addition, outside the polarizer 217, the structure is formed in which a fluorescent tube 220 and a light guide plate 219 are provided which guides light emitted from the fluorescent tube 220 into the liquid crystal panel through the polarizer 217. The light guide plate 219 has protrusions and depressions formed on the entire rear surface thereof to provide light scattering or is a transparent body made, for example, of an acrylic resin sheet provided with a layer printed thereon to provide light scattering. Light emitted from the fluorescent tube 220 light source is received at the end surface of light guide plate 219, so that substantially uniform light is emitted from the upper surface shown in the figure. For the convenience of illustration in FIG. 1, the fluorescent tube 220 which is fitted to the TFT array substrate 10 as described above is omitted in the figure.

In addition to the date line drive circuit 101, the scanning line drive circuits 104, and the like, on the TFT array substrate 10 shown in FIGS. 1 and 2, for example, there may be provided a sampling circuit to sample an image signal on an image signal line and supply it to the corresponding data line, a precharge circuit to supply a precharge signal at a predetermined voltage level to a plurality of data lines prior to the supply of the image signal, and an inspection circuit to inspect the quality, defect, and the like of an electro-optic device in process or before shipment. Furthermore, in this exemplary embodiment, instead of the data line drive circuit 101 and the scanning line drive circuits 104 provided on the TFT array substrate 10, for example, a drive LSI mounted on a TAB (tape automated bonding) substrate may be electrically and mechanically connected via an anisotropic conductive film provided on the peripheral portion of the TFT array substrate 10.

Figure 3:
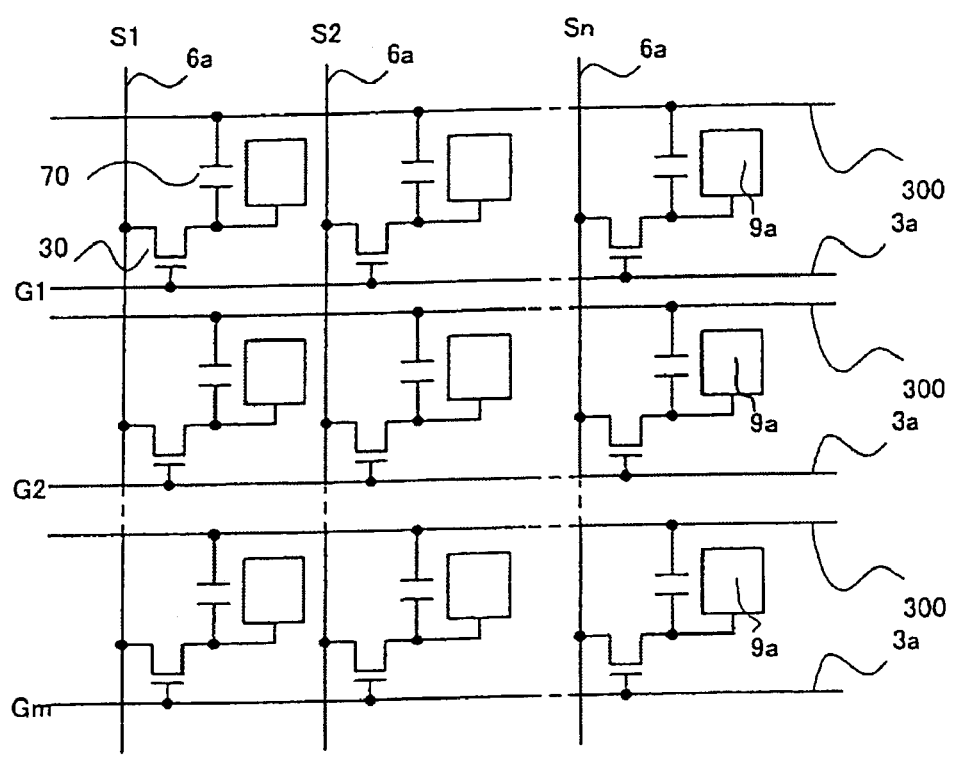
FIG. 3 is a schematic circuit diagram of wirings, electronic elements, and the like provided on a TFT array substrate 10.

Next, referring to FIG. 3, the electrical structure of a pixel portion of the electro-optic device shown in FIGS. 1 and 2 is described in detail below. FIG. 3 is a schematic circuit diagram of wiring, electronic elements, and the like formed on the TFT array substrate 10.

As shown in FIG. 3, in each of a plurality of pixels of this exemplary embodiment, which are arranged in a matrix and which form the image display region of the electro-optic device, a pixel electrode 9*a* and a TFT 30 which controls switching of the pixel electrode 9*a* are formed, and a data line 6*a* to which an image signal is supplied is electrically connected to the source of the TFT 30. Image signals S1, S2, . . . , Sn to be supplied to the data line 6*a* may be supplied in that order in a line sequential manner or may be supplied one group at a time to the data lines 6*a* adjacent to each other. In addition, a scanning line 3*a* is connected to the gate of the TFT 30, and scanning signals G1, G2, . . . , and Gm in the form of pulse are applied to the scanning line 3*a* in that order in a line sequential manner.

The pixel electrode 9*a* is electrically connected to the drain of the TFT 30, and by closing the switch of the TFT 30, which is used as a switching element, for a predetermined period of time, the image signals S1, S2, . . . , and Sn supplied from the data line 6*a* are written at a predetermined timing. The image signals S1, S2, . . . , and Sn having specific levels and which are written in the liquid crystal, including a type of electrooptic material, through the pixel electrode 9*a* are retained for a predetermined period of time between the pixel electrode 9*a* and the facing electrode 22 formed on the substrate facing the TFT array 20 (see FIG. 2). Since the alignment and ordering of the molecular aggregate of the liquid crystal are changed in accordance with the level of a voltage applied thereto, light is modulated, and hence, gray scale display can be performed. In the case of a normally-white mode, the transmittance of incident light is decreased in accordance with a voltage applied to each pixel, and when a normally-black mode is used, the transmittance of incident light is increased in accordance with a voltage applied to each pixel, whereby, on the whole, light having contrast in accordance with an image signal is emitted from the electro-optical device. In order to reduce or prevent leakage of the retained image signals, a storage capacitor 70 is additionally provided in parallel with a liquid crystal capacitor formed between the pixel electrode 9*a* and the facing electrode 22.

The storage capacitor 70 can include, for example, a fixed-potential capacitive electrode which is composed of a part of a capacitor line 300, and a pixel-potential capacitive electrode which is connected to the drain side of the TFT 30 and the pixel electrode 9*a*.

<2. Detailed Structure of Liquid Crystal Device>

Figure 4:
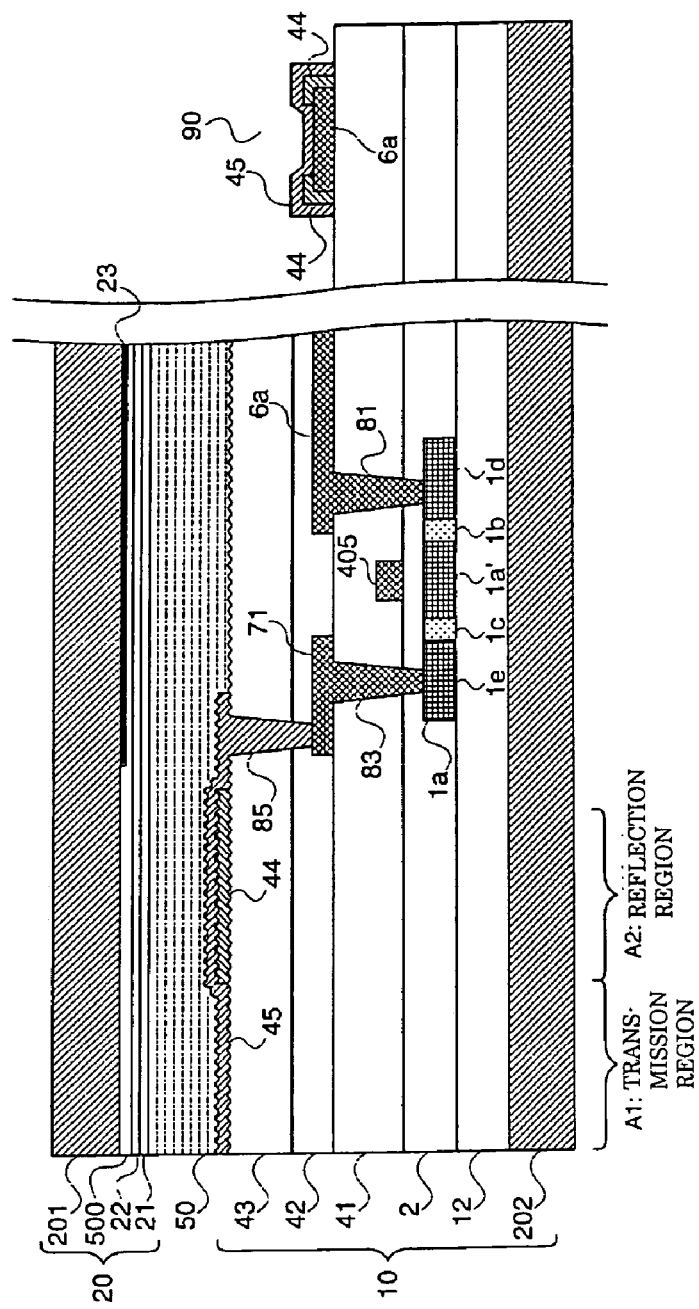
FIG. 4 is a partial cross-sectional view of an electro-optic device.

FIG. 4 is a partial cross-sectional view of a liquid crystal device. In this figure, in order to recognize individual layers and constituent elements in the figure, the reduction scales of individual layers and constituent elements differ from each other.

As shown in the figure, the liquid crystal device is formed of the TFT array substrate 10, the substrate facing the TFT array 20, and the liquid crystal layer 50 provided therebetween.

First, as for the substrate facing the TFT array 20, the light shielding film 23, color filters 500, an alignment film 21, and the facing electrode 22 are provided on the first transparent board 201. The color filters 500 are formed of red (R), green (G), and blue (B) in accordance with individual pixels. The color filters 500 are formed, for example, by a photolithographic technique such as a pigment dispersion method. As the arrangement of the color filters 500, in addition to a stripe arrangement, for example, there may be mentioned a delta arrangement, a mosaic arrangement, and a triangle arrangement.

The light shielding film 23 is formed in the form of a lattice on the first transparent board 201 so as to define the spacing between the individual color portions of the color filters 500. The light shielding film 23 is formed of a metal, such as chromium (Cr) or nickel (Ni). The wiring portions and the element portions formed on the TFT array substrate 10 are mostly covered with the light shielding film 23. In addition to the functions of reducing or preventing light leakage through the space between the individual color portions of the color filters 500 and of reducing or preventing the colors thereof from being mixed to each other, the light shielding film 23 has a function of reducing or preventing the increase in temperature of the electro-optic device caused by incident light.

The facing electrode 22 is formed using a transparent electrode film, such as an ITO film, so as to cover the entire color filters 500. The alignment film 21 is formed over the entire facing electrode 22. The alignment film 21 is formed, for example, by applying a polyimide resin, and firing, followed by rubbing treatment.

Next, inside the seal portion 52 of the TFT array substrate 10, the TFTs 30 to provide pixel switching, the data lines 6a, reflection films 44, transparent conductive films 45 are provided, and at the ends of the data lines 6a which extend outside the seal portion 52, connection terminals 90 are formed.

An underlying insulating film 12 is provided over the entire second transparent board 202. The underlying insulating film 12 has a function of reducing or preventing the change in properties of the TFT 30 to provide pixel switching, which is caused, for example, by a roughening when the second transparent board 202 is polished and/or dirt remaining after washing.

The TFT 30 to provide pixel switching has a lightly doped drain (LDD) structure. The TFT 30 is formed of a gate 405; a channel region 1a' of a semiconductor layer 1a, in which a channel is formed by the electric field from the gate 405; an insulating film 2 including a gate insulating film which insulates the gate 405 from the semiconductor layer 1a; a lightly doped source region 1b and a lightly doped drain region 1c of the semiconductor layer 1a; and a highly doped source region 1d and a highly doped drain region 1e of the semiconductor layer 1a.

On the TFT 30 is provided a first interlayer insulating film 41, a passivation film 42, and an organic insulating film 43. In the first interlayer insulating film 41, contact holes 83 and 81 are formed, and in the passivation film 42 and the organic insulating film 43, a contact hole 85 is formed. In addition to a function as a protection film protecting the TFT 30 from alkaline contamination and moisture, the passivation film 42 has a function of improving the adhesion with the organic insulating film 43. In addition, the material for the organic insulating film 43 is a transparent organic material having superior insulating properties; for example, an acrylic resin.

In the case of a transmissive type electro-optic device, the surface of the organic insulating film 43 described above may be flat. However, in the case of a reflective or a transflective electro-optic device, protrusions and depressions are formed on the surface of the organic insulating film 43 in order to avoid mirror reflection. In FIG. 4, the latter case is shown. However, the present invention may also be applied to the former case.

The drain region 1e of the semiconductor layer 1a is electrically connected to the transparent conductive film 45 via the contact hole 83, a relay layer 71, and the contact hole 85. The transparent conductive film 45 is formed of ITO. In addition, under the transparent conductive film 45, the reflection film 44 is formed. The reflection film 44 is formed, for example, of aluminum.

The transparent conductive film 45 and the reflection film 44 described above form the pixel electrode 9a (see FIG. 2). In addition, at the upper side of the pixel electrodes 9a, the alignment film (not shown in the figure) processed by a predetermined treatment such as rubbing treatment is provided, and is formed using an organic film, such as a polyimide film.

An area at which the transparent conductive film 45 of the pixel electrode 9a only is present functions as an transmission region A1 through which light emitted from a backlight passes, and an area at which the reflection film 44 and the transparent conductive film 45 of the pixel electrode 9a are present functions as a reflection region A2 from which external light is reflected. In addition, protrusions and depressions may be formed on the surface of the organic insulating film 43 which is under the pixel electrodes 9a so as to form a great number of minute and semispherical depressions on the surface of the reflection film 44. Accordingly, mirror reflection is reduced or prevented, and reflective display with scattered light can be realized.

Figure 5:
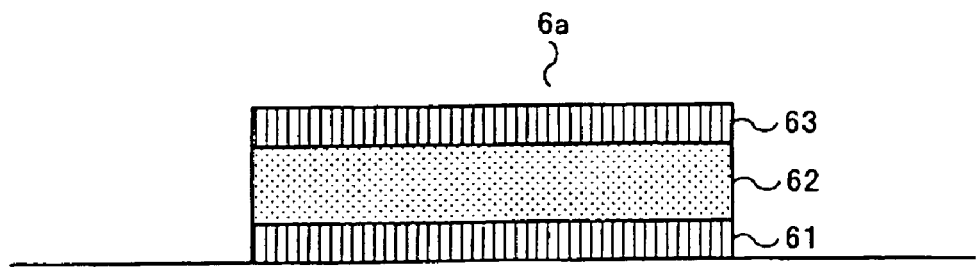
Figure 6:
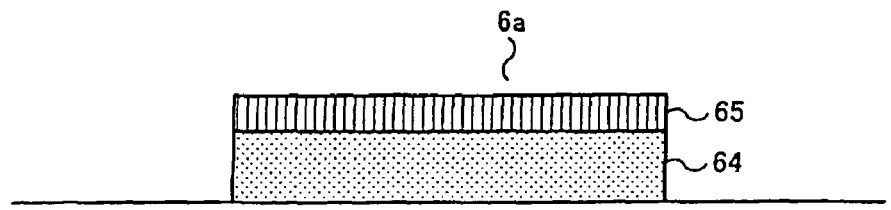

The highly doped source region 1d of the semiconductor layer 1a is connected to the data line 6a via the contact hole 81. The data line 6a has a multilayer structure formed of a plurality of layers. As shown in FIG. 5, the data line 6a of this exemplary embodiment is formed of a lower layer 61, a central layer 62, and an upper layer 63. For example, the lower layer 61, the central layer 62, and the upper layer 63 are formed of titanium, aluminum, and titanium nitride, respectively. In addition, the data line 6a may be a two-layered structure as shown in FIG. 6. In this case, a lower layer 64 is formed of aluminum, and an upper layer 65 is formed of titanium nitride.

Figure 7:
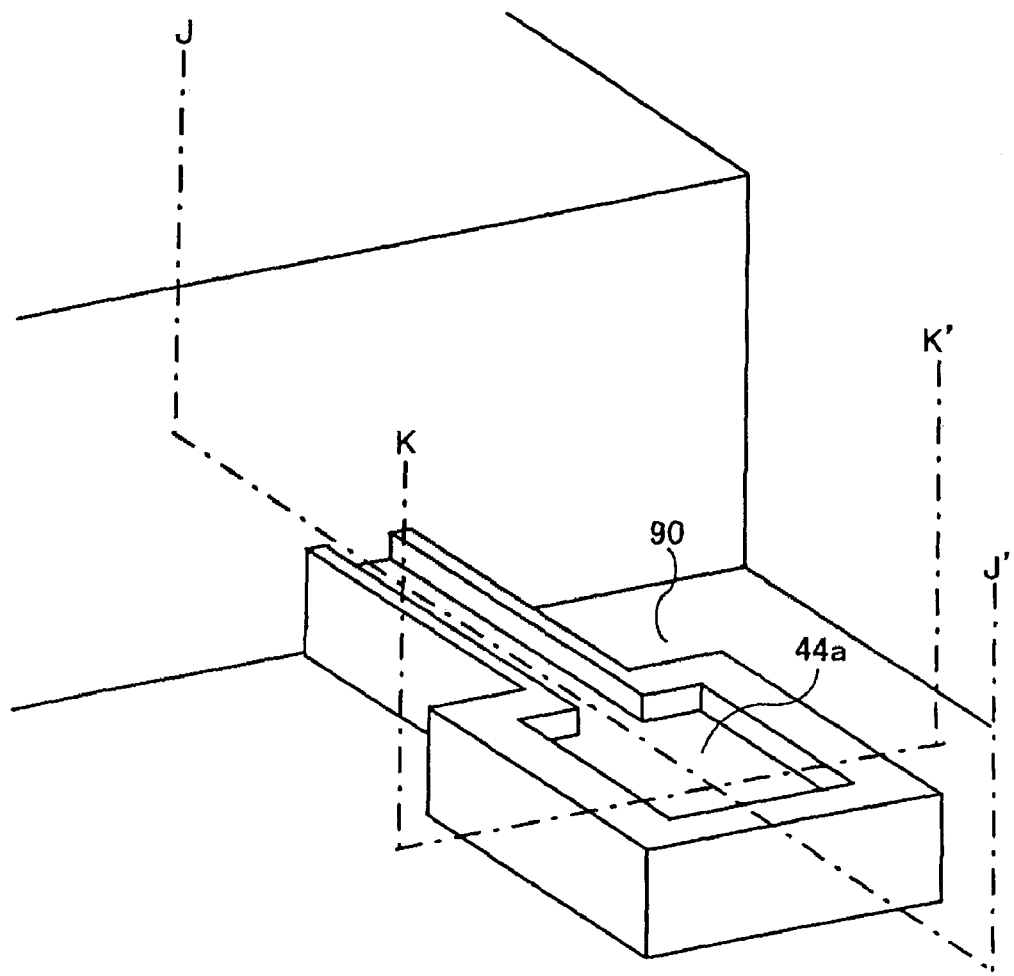
FIG. 7 is a perspective view showing the appearance of a connection terminal and the vicinity thereof.

Next, on the TFT array substrate 10 outside the seal portion 52, the connection terminals 90 are formed. On the data line 6a, the connection terminal 90 is formed including the reflection film 44 and the transparent conductive film 45 which are obtained by patterning. FIG. 7 is a perspective view showing the appearance of the connection terminal 90. As shown in this figure, the connection terminal 90 is formed outside the seal portion 52 and at the end portion of the data line 6a.

Figure 8:
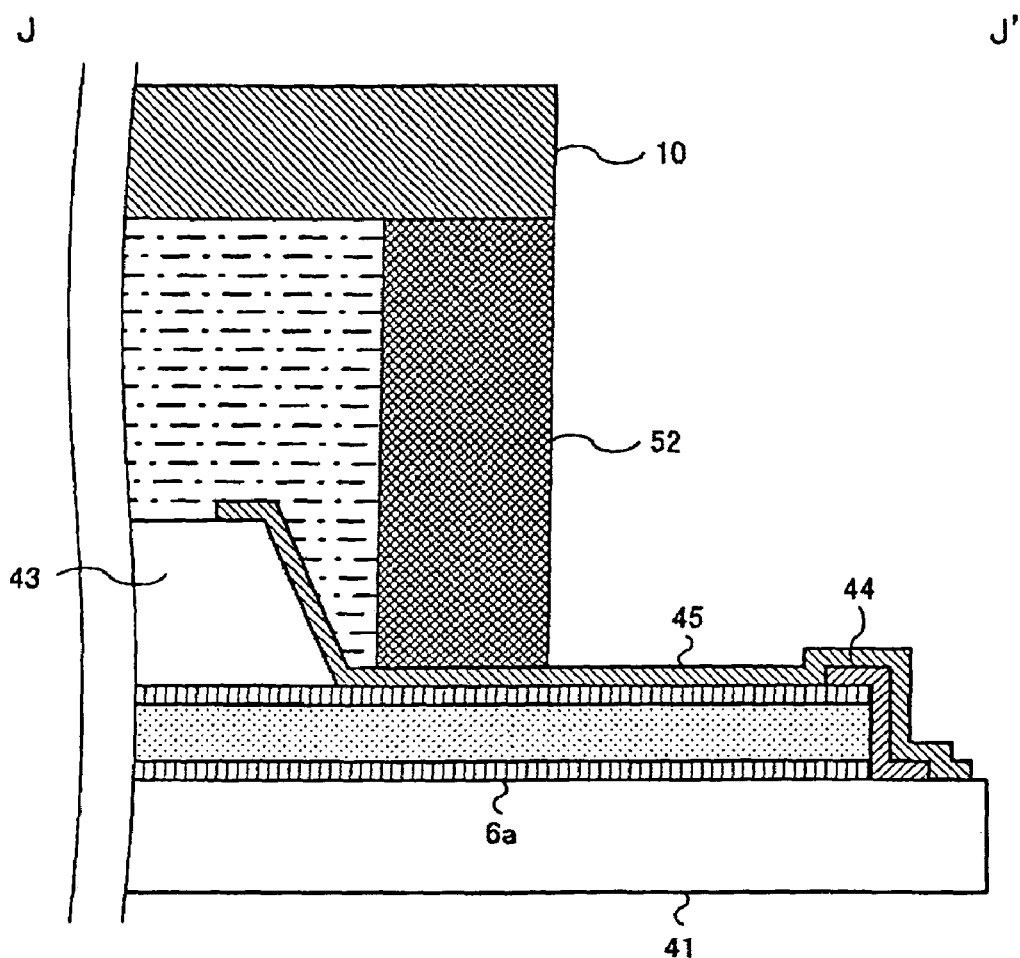
FIG. 8 is a cross-sectional view of an electro-optic device taken along plane J–J' shown in FIG. 7.
Figure 9:
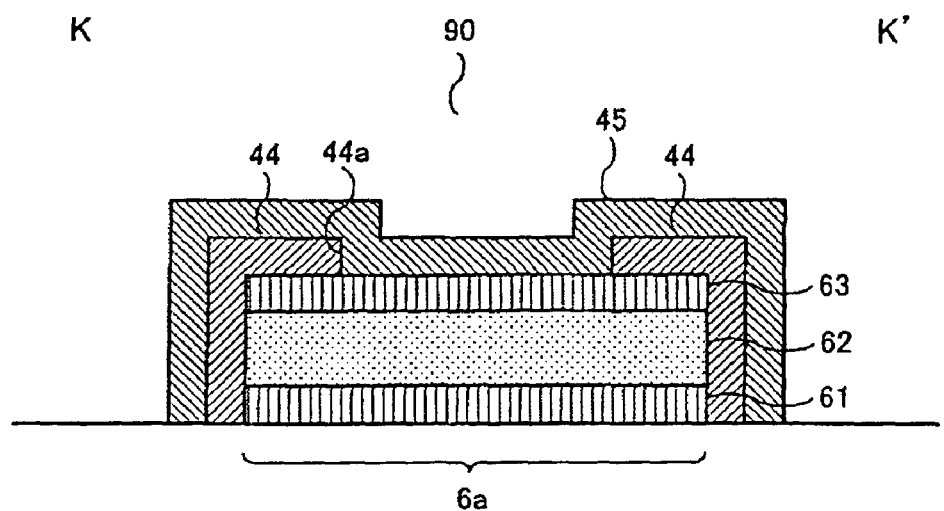
FIG. 9 is a cross-sectional view of an electro-optic device taken along plane K–K' shown in FIG. 7.

FIG. 8 is a cross-sectional view of the connection terminal 90 and the vicinity thereof taken along plane J–J' shown in FIG. 7, and FIG. 9 is a cross-sectional view of the connection terminal 90 taken along plane K–K' shown in FIG. 7.

As shown in these figures, since the organic insulating film 43 is not present outside the seal portion 52, the reliability of the connection terminal 90 and the wiring outside the seal portion 52 is not disadvantageously decreased by swelling of the organic insulating film 43.

In addition, since the wiring outside the seal portion 52 and the connection terminal 90 are not covered with the passivation film 42, the passivation film 42 can be formed by patterning using the same mask as that for the organic insulating film 43.

Furthermore, since the sidewalls and a part of the upper surface of the data line 6a are covered with the reflection film 44, a problem in that the central layer 62 is etched by an etchant when the reflection film 44 is formed by patterning will not occur.

In addition, as for the connection terminal 90, a contact hole 44a is formed in the reflection film 44, and the transparent conductive film 45 is connected to the upper layer 63 of the data line 6a via the contact hole 44a. The reason for this is described below.

That is, as described further below, the transparent conductive film 45 made of ITO is formed by sputtering in an oxygen-containing atmosphere following the formation of the reflection film 44. Hence, an oxide film is formed at the interface between the reflection film 44 made of aluminum and the transparent conductive film 45. The resistance per unit area of this oxide film is higher than that of the upper layer 63 made of titanium nitride. Accordingly, in the connection terminal 90, when the entire data line 6a is covered with the reflection film 44, the conductivity is decreased, and as a result, superior conductivity is difficult to obtain.

On the other hand, since being made from titanium nitride, the upper layer 63 forming the data line 6a is less readily oxidized than aluminum, and hence an oxide film is not formed in the forming of the transparent conductive film 45 by sputtering or the like.

Accordingly, the contact hole 44a is formed in the reflection film 44, and the transparent conductive film 45 and the upper layer 63 are directly connected to each other via the contact hole 44a. By the structure described above, the resistance of the connection terminal 90 is decreased, and as a result, superior conductance can be obtained.

<3. Manufacturing Method of Liquid Crystal Device>

Figure 10:
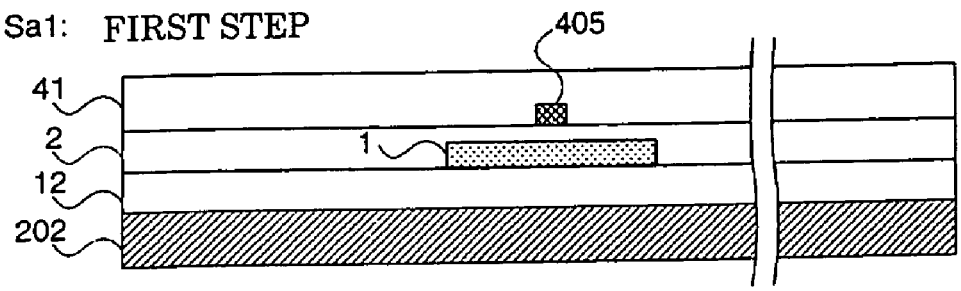
FIG. 10 is a schematic showing steps of a manufacturing process of the TFT array substrate 10.
Figure 10:
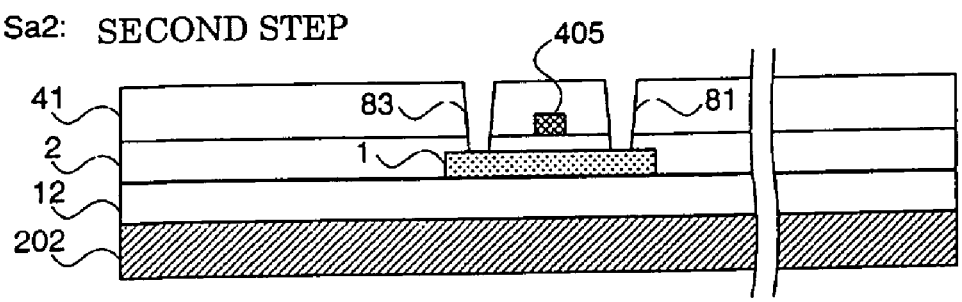
Figure 10:
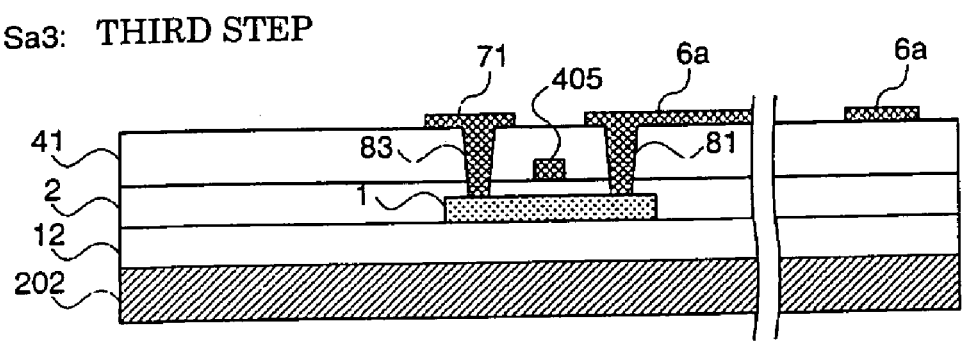
Figure 10:
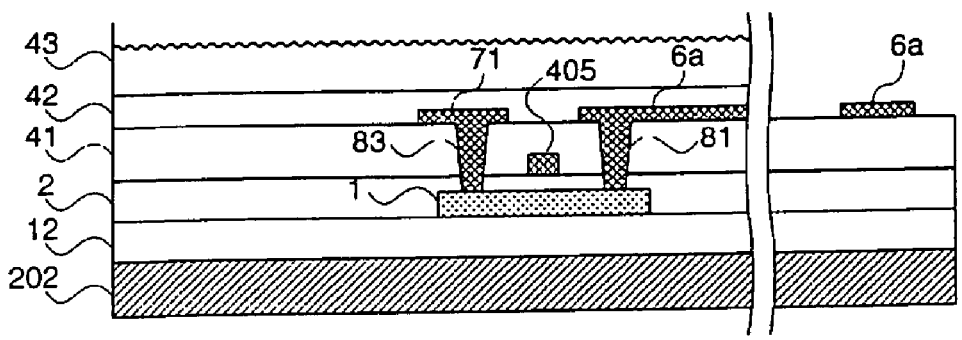
Figure 11:
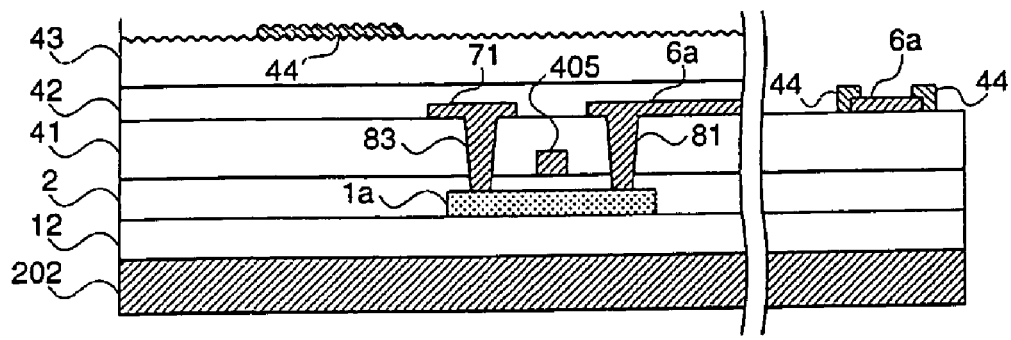
FIG. 11 is a schematic showing steps of a manufacturing process of the TFT array substrate 10.
Figure 11:
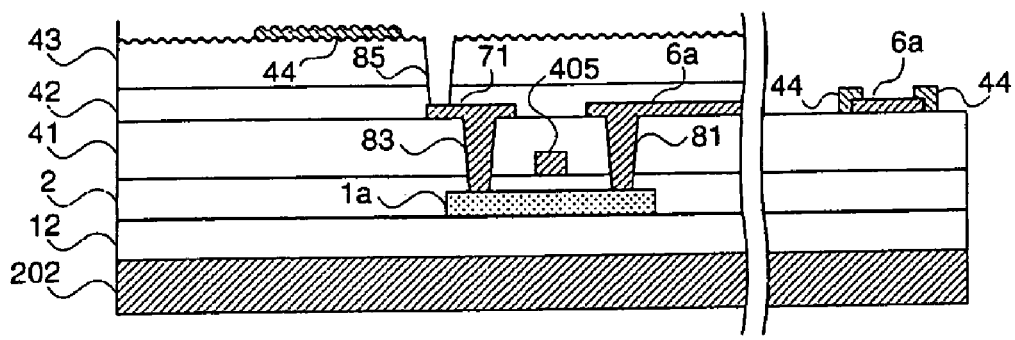
Figure 11:
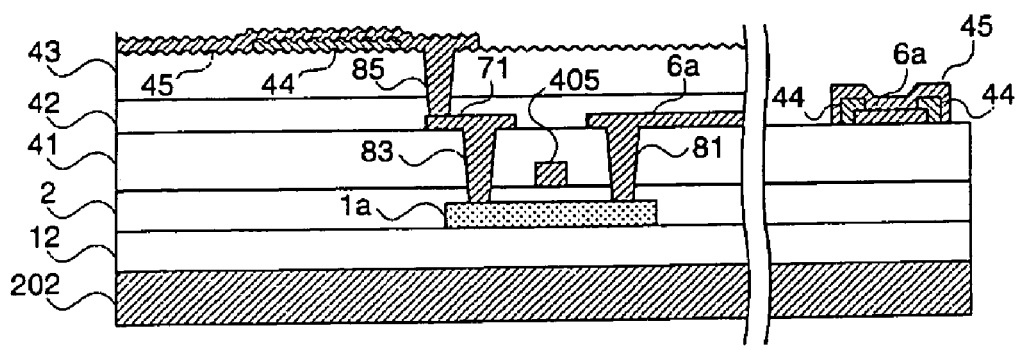

A manufacturing method of a liquid crystal device is described below. FIGS. 10 and 11 show steps of a process for manufacturing the TFT array substrate 10.

In first step Sa1, on the second transparent board 202 is formed the underlying insulating film 12, the semiconductor layer 1a, the insulating film 2, the first interlayer insulating film 41, and the like in that order using a planar process.

In second step Sa2, the contact holes 81 and 83 are formed by dry etching, such as reactive etching or reactive ion beam etching, or by wet etching.

In third step Sa3, the relay layer 71 and the data line 6a are formed. In particular, by sputtering or the like, titanium, aluminum, and titanium nitride are sequentially formed one over the other, and by a photolithographic step, an etching step, and the like, the relay layer 71 and the data line 6a are formed. In the steps described above, the data line 6a is simultaneously formed outside the seal portion 52 at a position at which the connection terminal 90 is to be formed.

In fourth step Sa4, over the relay layer 71 and the data line 6a, the passivation film 42 made of a silicate glass, such as NSG, PSG, BSG, or BPSG, a silicon nitride film, a silicon oxide film, or the like is formed, for example, by atmospheric or reduced-pressure CVD using a TEOS gas or the like.

Subsequently, on the passivation film 42, the organic insulating film 43 composed of a photocurable acrylic resin, an acrylic resin, an epoxy resin, or the like is formed by application using spin coating, printing, or the like, followed by curing. Where the protrusions and depressions are formed on the organic insulating film 43, protrusions are exposed for curing using a mask, depressions are not exposed so as to remain uncured, and the resin may then be cured by post baking.

Next, in fifth step Sa5, on the organic insulating film 43, aluminum is deposited by sputtering, deposition, or the like, and by a photolithographic step, an etching step, and the like, the reflection film 44 is formed. In this formation, at the position outside the seal portion 52 at which the connection terminal 90 is to be formed, the reflection film 44 is formed from the sidewalls to the upper surface of the data line 6a by patterning. Accordingly, when an unnecessary part of the aluminum is removed using an etchant, the problem that aluminum forming the central layer 62 of the wiring extending to the connection terminal 90 and the data line 6a outside the seal portion 52 is melted to form a side-cut is solved.

In sixth step Sa6, the contact hole 85 is formed by dry etching, such as reactive etching or reactive ion beam etching, or by wet etching.

In seventh step Sa7, by sputtering or the like, ITO is deposited over the entire surface in an oxygen atmosphere, and by a photolithographic step, an etching step, and the like, the transparent conductive film 45 is formed. In this formation, at the connection terminal 90 located outside the seal portion 52, the upper surface 63 of the data line 6a and the transparent conductive film 45 are connected to each other. Accordingly, even when an oxide film is formed at the interface between the reflection layer 44 and the transparent conductive film 45 by sputtering, the resistance of the connection terminal 90 can be decreased to a low level. Thus, the TFT array substrate 10 is formed.

A method for manufacturing the substrate facing the TFT array 20 and a method for manufacturing a liquid crystal device from the TFT array substrate 10 and the substrate facing the TFT array 20 are described below.

In order to form the substrate facing the TFT array 20, as the first transparent board 201, a light transmissive plate such as a glass plate is prepared, and on the first transparent board 201, the light shielding film 23 is formed serving as a black matrix. The light shielding film 23 is formed, for example, by sputtering a metal material, such as Cr, Ni, or aluminum, followed by a photolithographic step, an etching step, and the like. In addition to the metal material mentioned above, the light shielding film 23 may be formed of a material, such as resin black, composed of a photoresist and carbon or titanium dispersed therein.

Subsequently, the color filters 500 are formed, and then a transparent conductive thin film made of ITO or the like having a thickness of approximately 50 to 200 nm is then formed by sputtering or the like on the color filters 500, thereby forming the facing electrode 22. Furthermore, after a coating solution of polyimide or the like for an alignment film is applied onto the entire surface of the facing electrode 22, for example, rubbing treatment is performed in a predetermined direction so as to have a predetermined pretilt angle, thereby forming the alignment film 21. As described above, the substrate facing the TFT array 20 is formed.

Finally, the TFT array substrate 10 and the substrate facing the TFT array 20 thus formed are bonded to each other with a sealing material so that the pixel electrodes 9a and the facing electrode 22 face each other, and by an evacuation method or the like, a liquid crystal mixture composed of, for example, several types of nematic liquid crystal is introduced into the gap between the two substrates so as to form a liquid crystal layer 50 having a predetermined thickness, thereby completing a liquid crystal device having the structure described above.

<4. Modification of Liquid Crystal Device>

In the exemplary embodiment described above, the data line 6a located outside the seal portion 52, at which the organic insulating film 43 is not present, is covered with the reflection film 44 and the transparent conductive film 45, but it is obvious that the data line 6a inside the seal portion 52 may be covered with the layers in the same manner as that described above.

Figure 12:
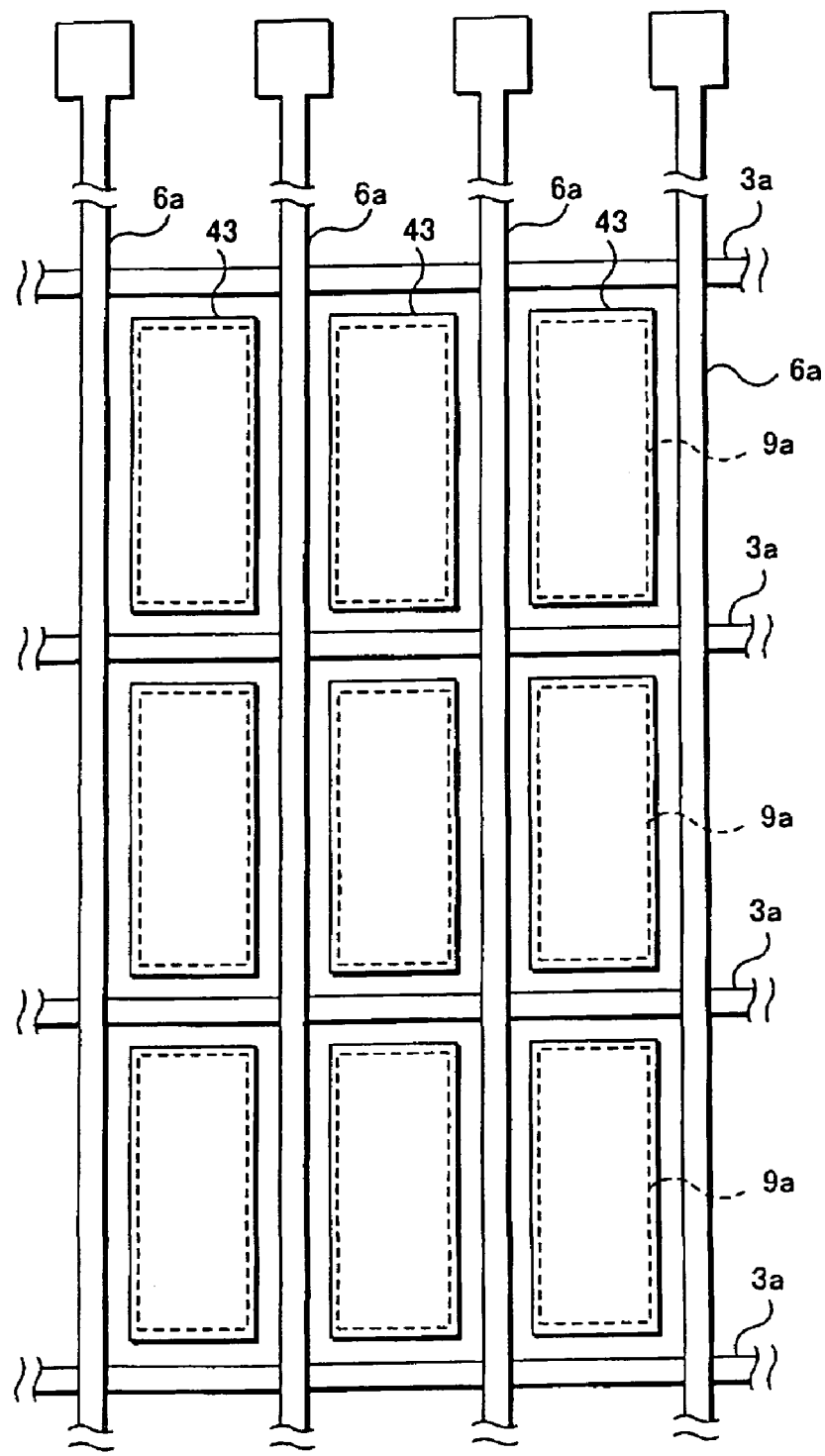
FIG. 12 is a schematic of the data lines 6a and organic insulating films 43 according to an exemplary modification.

For example, as shown in FIG. 12, when the organic insulating film 43 is present only at an area corresponding to each of the pixel electrodes 9a, and the sidewalls of the data line 6a are not protected, a problem may arise in that the central layer 62 is etched by an etchant when the reflection film 44 is formed. Accordingly, even the data line 6a located inside the seal portion 52 is preferably covered with the layers in the same manner as described above.

<5. Electronic Apparatus>

Examples of electronic apparatuses using the transflective electro-optic devices of the exemplary embodiments described above are described below with reference to FIGS. 13 to 15.

Figure 13:
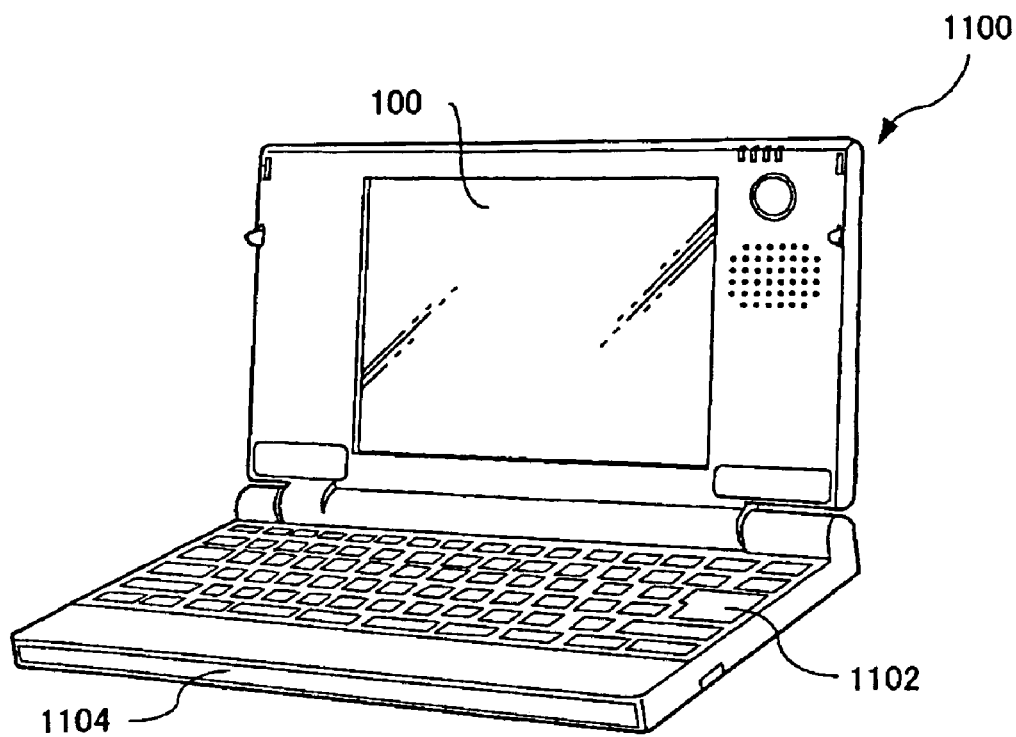
FIG. 13 is a perspective view of a mobile computer as an example of an electronic apparatus to which an electro-optic device of an exemplary embodiment is applied.

First, an example is described in which the electro-optic device described above is applied to a display unit of a mobile computer. FIG. 13 is a perspective view showing this structure. As shown in FIG. 13, a computer 1100 includes a display device 100 used as a display unit and a main body 1104 provided with a keyboard 1102.

Figure 14:
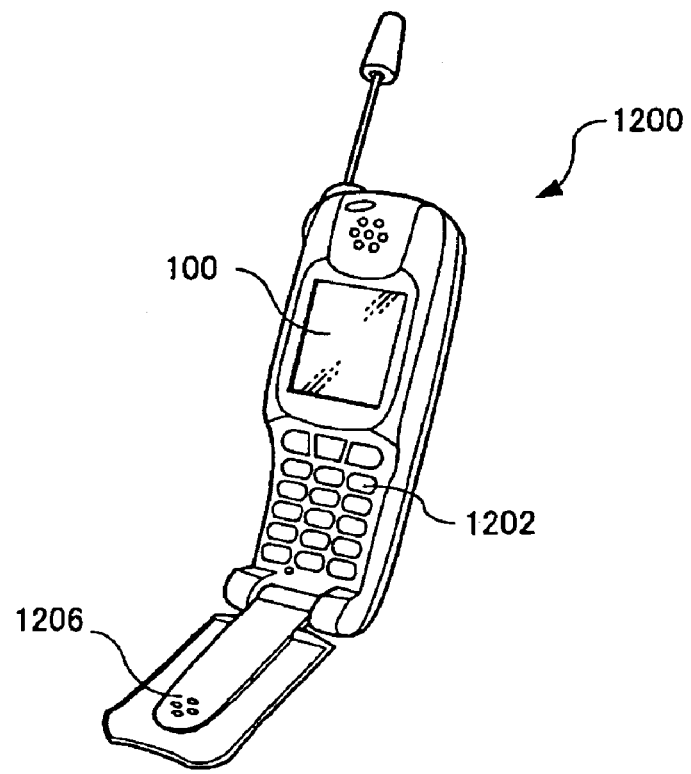
FIG. 14 is a perspective view of a mobile phone as another example of an electronic apparatus to which an electro-optic device of an exemplary embodiment is applied.

An example is described below in which the electro-optic device described above is applied to a display unit of a mobile phone. FIG. 14 is a perspective view showing this structure. As shown in FIG. 14, in addition to a plurality of operation buttons 1202, a mobile phone 1200 includes the above-described electro-optic device as a display device 100 together with a mouthpiece 1206 and an ear piece.

Figure 15:
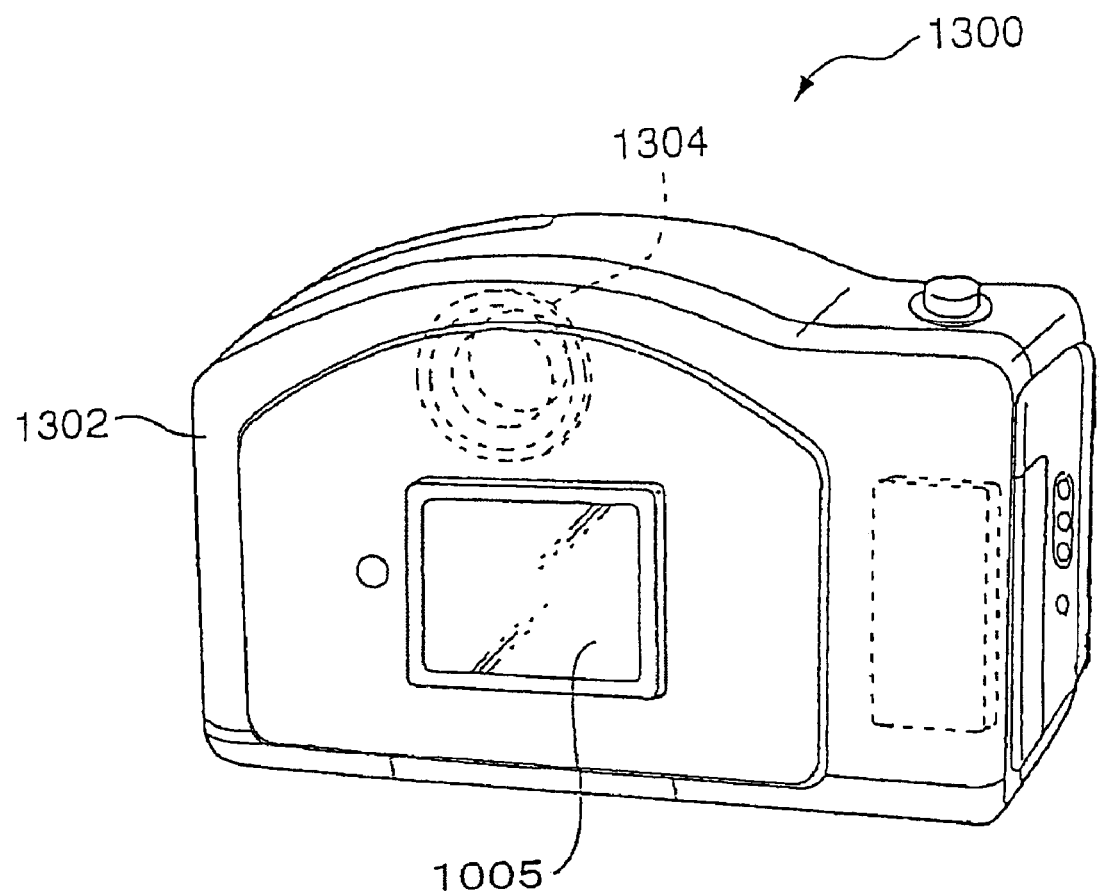
FIG. 15 is a perspective view of a digital still camera as another example of an electronic apparatus to which an electro-optic device of an exemplary embodiment is applied.
Figure 16:
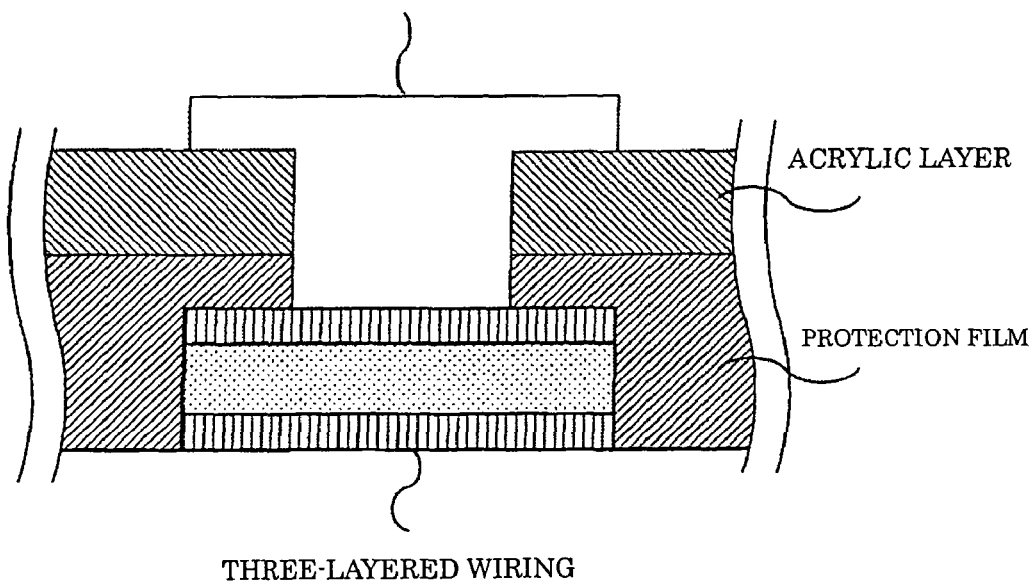
FIG. 16 is a cross-sectional view of a related art wiring structure.
Figure 17:
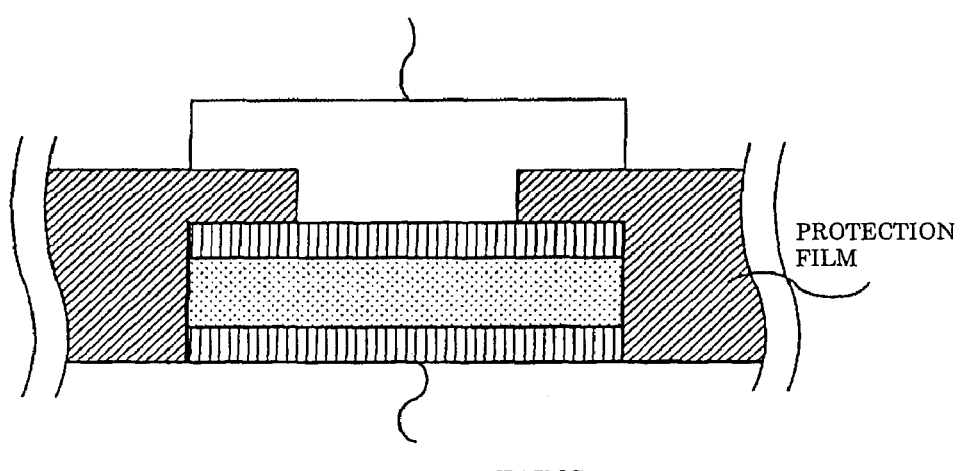
FIG. 17 is a cross-sectional view of another example of a related art wiring structure.
Figure 18:
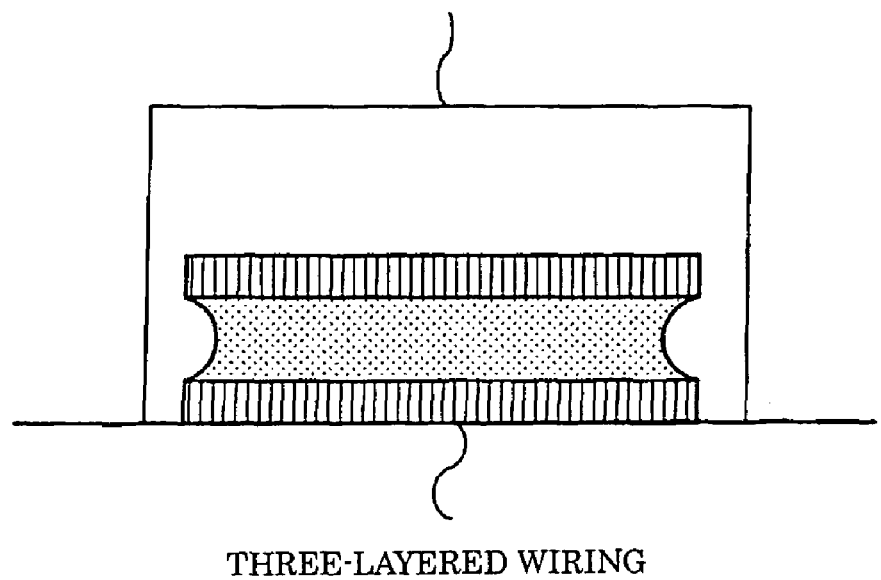
FIG. 18 is a cross-sectional view of another example of a related art wiring structure.

A digital camera is described below in which the electro-optic device described above is applied to a viewfinder. FIG. 15 is a perspective view showing the structure of the camera when it is viewed from the rear side. On the rear side of a case 1302 of a digital still camera 1300, the electro-optic device described above is provided as a display device 1005, and in accordance with image signals of a CCD 1304 provided on the front side of the case 1302, display is performed. That is, the display device 1005 functions as a viewfinder to display an object.

In addition to the electronic apparatuses described above, other electronic apparatuses can be used. For example, the following can be used: liquid crystal televisions, viewfinder type or direct viewing type video tape recorders, car navigation systems, pagers, electronic notebooks, electronic calculators, word processors, work stations, television phones, POS terminals, and apparatuses provided with a touch panel, for example.

The present invention is not limited to the exemplary embodiments described above, any modification may be made without departing from the spirit and the scope of the invention, and it is to be understood that the modified electro-optic devices described above, the manufacturing methods thereof, and the electronic apparatuses using the same are all included in the technical scope of the present invention.

What is claimed is:

1. A method for manufacturing an electro-optic device having a structure in which an electro-optic material is enclosed inside a seal, comprising:
    forming a plurality of semiconductor elements with electrodes, arranged in a matrix on a substrate;
    forming wiring composed of a first layer and a second layer provided thereon and which are connected to connection terminals to be formed outside the seal;
    forming an insulating layer on the semiconductor elements inside the seal;
    forming a plurality of reflection electrodes on the insulating layer using a first material so as to correspond to the semiconductor elements and forming a third layer using the first material for the wiring so as to cover at least the sidewalls thereof and to expose the second layer at a part of the connection terminals; and
    forming transparent electrodes using a second material so as to cover the reflection electrodes and forming a fourth layer at least on the portion of the wiring located outside the seal where the second layer is exposed.

2. The method for manufacturing an electro-optic device according to claim 1,
    further including forming the first layer of the first material.

3. The method for manufacturing an electro-optic device according to claim 1,
    the forming of the transparent electrodes and the fourth layer including performing the forming in an atmosphere containing oxygen so that an oxide layer having a relatively high resistance per unit area compared to that of the second layer is formed at the interface between the third layer and the fourth layer, and the second layer is formed of a material which is less readily oxidized than the third layer.

4. The method for manufacturing an electro-optic device according to claim 1,
    the wiring having a three-layered structure including a lower layer under the first layer, and
    the forming of wiring including forming the lower layer, the first layer, and the second layer in that order by patterning.

5. The method for manufacturing an electro-optic device according to claim 1, the first layer containing aluminum, the second layer containing titanium nitride, the first material containing aluminum, and the second material containing indium tin oxide.

6. An electro-optic device, comprising:
    a seal;
    an electro-optic material enclosed inside the seal; and
    connection terminals disposed outside the seal, the connection terminals each including a first layer, a second layer provided on the first layer, a third layer which is formed of a conductive material so as to cover at least the sidewalls of the first layer and the second layer and formed so as to expose a part of the second layer, and a fourth layer formed on the exposed portion of the second layer.

7. The electro-optic device according to claim 6, further comprising pixels each formed of a reflection electrode composed of a reflective conductive material and a transparent electrode composed of a transparent conductive material.

8. An electro-optic device, comprising:
    a seal;
    an electro-optic material enclosed inside the seal;

connection terminals disposed outside the seal, the connection terminals each including a first layer, a second layer provided on the first layer, a third layer which is formed so as to cover at least the sidewalls of the first layer and the second layer and formed so as to expose a part of the second layer, and a fourth layer formed on the exposed portion of the second layer; and pixels each formed of a reflection electrode composed of a reflective conductive material and a transparent electrode composed of a transparent conductive material, the reflection electrode and the third layer being formed of the same reflective conductive material, and the transparent electrode and the fourth layer being formed of the same transparent conductive material.

9. An electro-optic device, comprising:

a seal;

an electro-optic material enclosed inside the seal;

connection terminals disposed outside the seal; and wiring connected to the connection terminals, the wiring including a first layer, a second layer provided on the first layer, and a third layer which is formed of a conductive material so as to cover at least the sidewalls of the first layer and the second layer.

10. An electro-optic device, comprising:

a seal;

an electro-optic material enclosed inside the seal;

a plurality of semiconductor elements arranged in a matrix inside the seal;

pixels each formed of a reflection electrode composed of a reflective conductive material and a transparent electrode composed of a transparent conductive material so as to correspond to the semiconductor elements;

connection terminals formed outside the seal; and wiring having a first layer and a second layer provided thereon, the wiring connected to the connection terminals, the connection terminals each including a third layer formed of the conductive material so as to cover at least the sidewalls of the first layer and the second layer and to expose at least a part of the second layer, and a fourth layer formed on the exposed portion of the second layer.

11. An electro-optic device, comprising:

a seal;

an electro-optic material enclosed inside the seal;

a plurality of semiconductor elements arranged in a matrix inside the seal;

pixels each formed of a reflection electrode composed of a reflective conductive material and a transparent electrode composed of a transparent conductive material so as to correspond to the semiconductor elements;

connection terminals formed outside the seal; and wiring having a first layer and a second layer provided thereon, the wiring connected to the connection terminals, the connection terminals each including a third layer formed so as to cover at least the sidewalls of the first layer and the second layer and to expose at least a part of the second layer, and a fourth layer formed on the exposed portion of the second layer, at least one organic insulating film having protrusions and depressions, which is formed inside the seal and on the semiconductor elements, the reflection electrode having protrusions and depressions due to formation on the organic insulating film, the transparent electrode being formed so as to cover the reflection electrode, the reflection electrode and the third layer being formed of the same reflective conductive material, and the transparent electrode and the fourth layer being formed of the same transparent conductive material.

12. The electro-optic device according to claim 11, the wiring having a three-layered structure having a lower layer under the first layer, the lower layer containing titanium, the first layer containing aluminum, the second layer containing titanium nitride, the reflection electrode and the third layer containing aluminum, and the transparent electrode and the fourth layer containing indium tin oxide.

13. An electronic apparatus, comprising:

the electro-optic device according to claim 11.

* * * * *